United States Patent Office 3,337,800
Patented Aug. 22, 1967

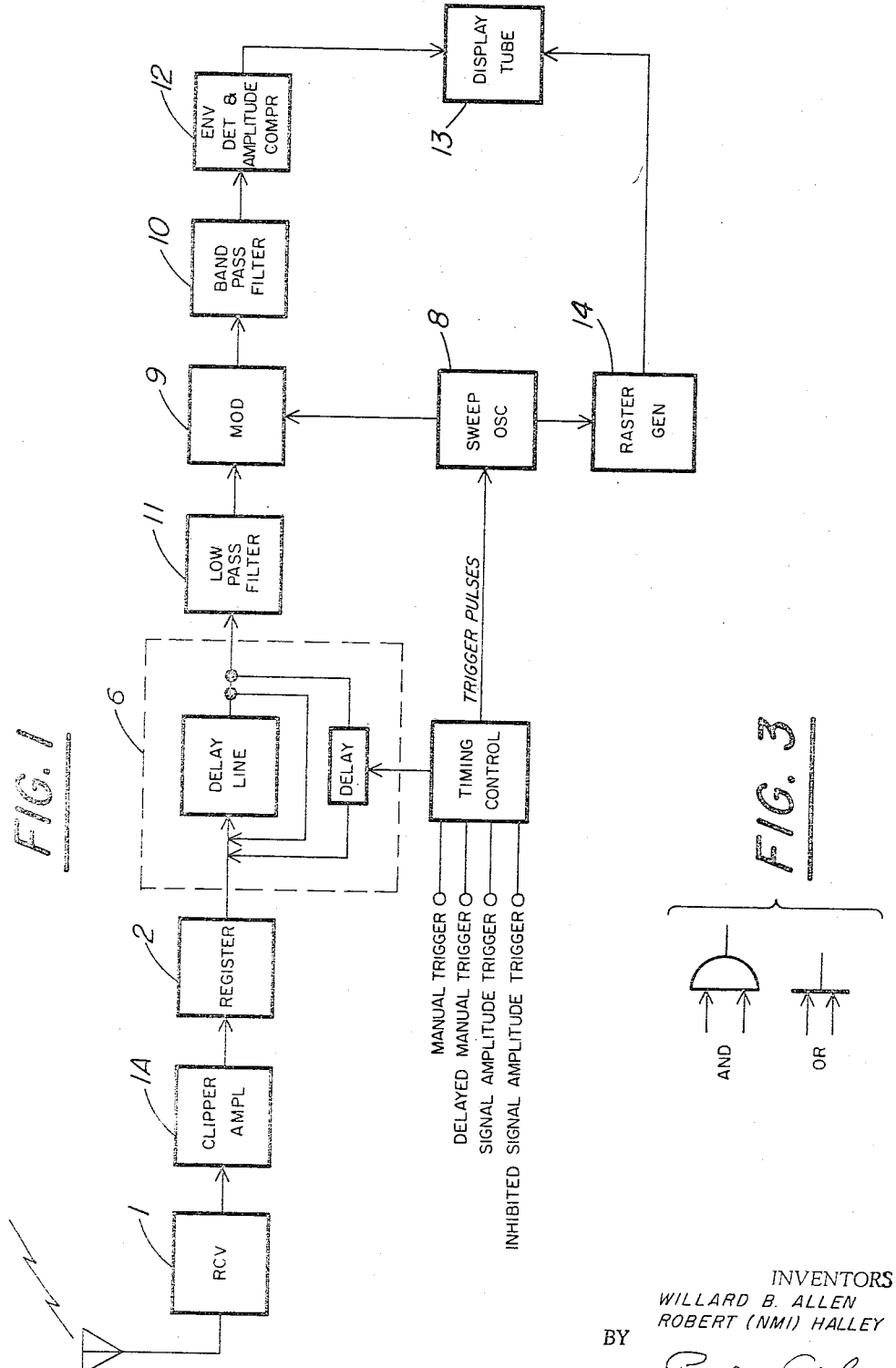

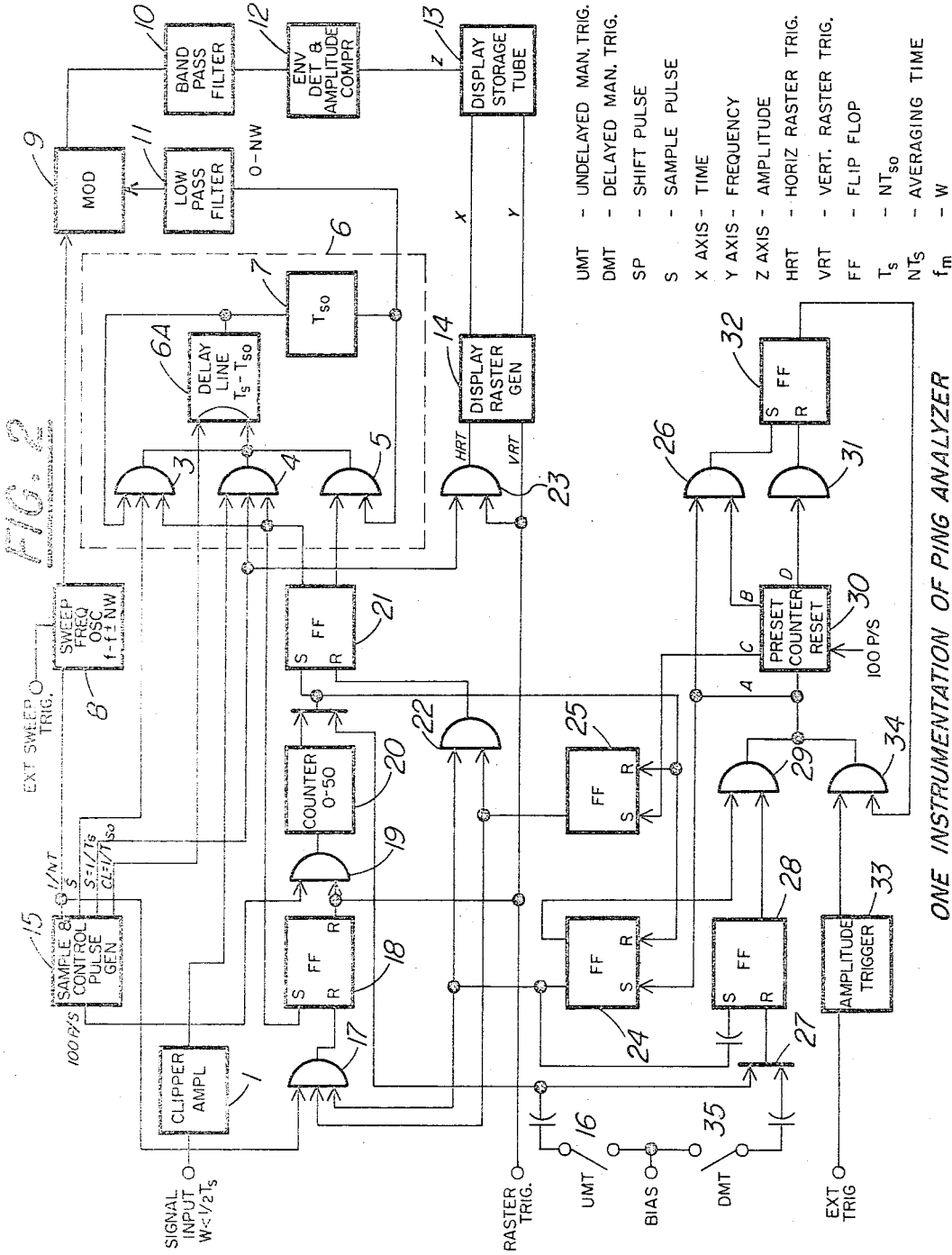

3,337,800
DELAY LINE TIME COMPRESSOR FOR
SPECTRUM ANALYSIS
Robert Halley, La Jolla, and Willard B. Allen, San Diego,
Calif., assignors to the United States of America as
represented by the Secretary of the Navy
Filed July 30, 1964, Ser. No. 386,460
4 Claims. (Cl. 324—77)

The invention described herein may be manufactured and used by or for the Government of the United States of America for governmental purposes without the payment of any royalties thereon or therefor.

This invention relates to the compressors for enabling the analysis of the frequency content of "slow" signals such as the ping signals of sonar.

The object of this invention is to analyze short samples of complex electronic signals yielding signal amplitude as a function of both frequency and time. The analyzer output may be displayed on the rectangular raster of a cathode ray storage tube with time as one rectangular coordinate, and frequency as the other coordinate, and with signal amplitude being indicated by the brightness of the spot on the tube face. The frequency range to be analyzed as well as the effective bandwidth and sample duration may each be varied within broad limits.

Various systems have been proposed for analyzing short samples of complex electronic signals. These systems normally make a magnetic recording on a disc, drum, or tape loop. After the sample has been selected and stored the recording is replayed many times into a heterodyne frequency analyzer. On play-back the magnetic record is speeded up to achieve frequency multiplication and a reduction in analysis time. The effective frequency of the analysis filter in the heterodyne analyzer is slowly moved across the frequency range to be analyzed with the sweep rate chosen so that effective filter frequency moves approximately one filter bandwidth each time a sample is replayed. The analyzer output is normally displayed by writing with a moving stylus on a sheet of facsimile-type paper. The motion of the stylus along one dimension is coordinated with the motion of the recorded magnetic sample so that the position of the stylus is a linear function of time during the sample. The other dimension of motion of the stylus is coordinated with the frequency of the analyzer so that the position of the stylus is a linear function of frequency. The amplitude of the signal from the analyzer controls the stylus-to-paper voltage so that a higher amplitude will produce a darker spot on the facsimile paper. Unfortunately, even where the inertia of such a mechanical system has been obviated by the substitution of a cathode ray tube, the system is relatively inflexible in adjustment. For example, it is not convenient to quickly and arbitrarily start the analysis at random points in the signal sample.

Accordingly, another object of this invention is to provide complete flexibility in the starting and stopping of spectrum analysis.

The objects of this invention are attained in a system comprising a closed signal recirculating loop or circuit, responsive to an input signal for providing a series of signals circulating in said circuit, and means for adding new signals to one end of the series of recirculating signals and for discarding the oldest of the series. This process is called the "loading phase." In the absence of incoming signals, it may be desired to store the last series of signals and to prevent their discard. To this end, the delay in the closed loop is increased to exactly equal the time of $T_s$. By means including a sweep frequency oscillator, a modulator, and a bandpass filter, the frequencies of the series of signals may be read out through the bandpass filter for each recirculation of the series in the loop. Logic circuitry is provided for controlling the beginning of the loading phase, the beginning of the storage phase, the undelayed manual trigger for instantly starting a loading cycle and, finally, for starting at any future time the loading of a series of signals.

Other objects and features of this invention will become apparent to those skilled in the art by referring to the specific embodiment described in the following specification and shown in the accompanying drawing in which:

FIG. 1 is a block diagram for showing, generally, the flow of information in the system of this invention;

FIG. 2 is a more detailed diagram of the invention contemplated in FIG. 1; and

FIG. 3 shows the AND and OR logic symbolism used in FIG. 2.

The system described here and shown in broad outline in FIG. 1 has been designed for the analysis of sonar pulses, sonar echoes and sonar reverberations. The various parameters mentioned have been arbitrarily chosen for this application. The signal input is taken from the sonar receiver 1 with its receiving hydrophone. The received signal may be at any frequency over a very wide range but preferably is shifted in the receiver so that the output of the receiver lies in the frequency range between 0 and 1,000 cycles per second. The signal sample length, T, to be analyzed has been arbitrarily determined to be of any value, such as two seconds. The low frequency signals are amplified and clipped in the clipper amplifier 1A to produce a series of binary pulses. The shift register 2 may be employed, if desired, to divide the signal pulse rate by any desired factor. Samples of the signal are injected into a shift register 2, with $l$ stages, with shift pulses $SP_1$ from a source, not shown in FIG. 1. For convenience, it will be assumed register 2 has four stages. The register 2 then acts as a buffer to match the signal sampling rate with the recirculation rate of the time compressor 6. Each shift pulse can advance the information one stage in shift register 2. Every 4th shift pulse, all the samples stored in register 2 are transferred to the time compressor 6 by another clock pulse, $SP_2$ from said source and the sample pulse S. Thus the signal sample rate (shift pulse rate) is 4 times the recirculation rate of the time compressor 6 and 4 signal samples are added to the time compressor 6 or each recirculation during sample pulse S. The delay line time compressor of the type employed here, and now popularly known as "Deltic," includes among other features a recirculating delay line described in the U.S. patent to V. C. Anderson, No. 2,958,039, dated Oct. 25, 1960. This device allows for playback-speed-up ratios, and consequent frequency multiplication ratios, of many thousands to one. The output of the recirculating delay line is passed through the lowpass filter 11 and applied to one of the two input terminals of the mixer modulator 9. To the other input terminal is applied the output of the sweep oscillator 8. The modulation products at the output of the modulator are passed through the bandpass filter 10. The sweep rate of the sweep oscillator 8 is determined by the breadth of the pass band of the filter. After envelope detection and amplitude compression at 12, the information is applied to the control grid of the cathode ray display tube 13. The sweep voltages for the display tube are generated by the raster generator 14 which, in turn, is synchronized by the sweep oscillator 8.

If the sample length T, to be analyzed, has been arbitrarily determined to be two seconds and the input signal bandwidth is 0 to 1000 c./s. the signal must be sampled at a rate of at least 2,000 bits per second and the delay line must store 4,000 bits. Four samples are added each recirculation period of 2,000 microseconds. At a clock rate of 2 megacycles per second and a Deltic storage capacity of 4,000 bits the recirculation time will be 2,000 microseconds. This provides a frequency multiplication in the ratio of 1,000 to 1. The effective bandwidth of the analysis filter was chosen to be 20 cycles per second and thus the actual frequency bandwidth in real time is 20,000 cycles per second. The sweep oscillator 8 must then sweep across a range of 1 megacycle per second to cover the 1,000 cycle per second input band. This sweep is accomplished in a period of ½ second which is the total analysis time for the system. During the ½ second analysis time the Deltic can make 250 recirculations. The sweep rate of the heterodyne oscillator is such that the signal is shifted one output filter bandwidth every 5 recirculations of the Deltic. Such redundancy improves the picture on the display screen.

As explained in the Anderson patent, supra, the time compression and sampling process is carried out in a continuous manner by removing the oldest sample in the compressed replica of the original signal and by adding a new sample each time the replica completes one cycle of circulation in the storage channel. In other words, each sample selected from the incoming low frequency signal is introduced at the end of the replica; it then precesses slowly through the replica until after an interval T', it will have appeared N times at the output of the storage channel in the course of precessing from the end to the beginning of the sequence. In this, the normal, mode of operation of Deltic information is loaded continuously, discarding the oldest data as new data is added.

If the operator should hear a signal which he wishes to analyze he may then actuate the direct manual trigger, whereupon Deltic will be switched from the load mode to the store mode and the sweep oscillator 8 will be started and the analysis period will start immediately. If, on the other hand, the operator hears the beginning of a signal which he wishes to analyze he may then actuate the delayed manual trigger circuit whereupon the Deltic will continue to load new information for 1.9 seconds, in the example considered here, and the system will then switch to the analysis mode.

As a third alternative, the operator may actuate the signal amplitude trigger circuit whereupon an input signal must exceed a predetermined threshold level before it will initiate a pulse which has the same effect as actuating the delayed manual trigger. The Deltic continues to load for 1.9 seconds and the instrument then switches to the analysis mode.

Fourthly, the inhibited signal amplitude trigger may be actuated whereupon the system works as in the third alternative except that the amplitude trigger gate is enabled periodically for a short time, the period can be preset by the operator and is variable between 2.4 seconds to 12 or more seconds. This latter mode of operation is particularly useful in the analysis of sonar signals where a strong pulse appears at the start of each period of interest and where these pulses are uniformly spaced in time. If, for example, pulses are spaced 4 seconds apart the operator can set the inhibit time to just under 4 seconds. In all of the above operating modes the analysis output is displayed on the storage tube 13 and is retained until turned off or until just before the start of the next analysis period.

FIG. 2 shows one specific implementation of the control system of this invention. The logical operations of the timing control circuit is accomplished with conventional flip-flops, counters, and AND and OR circuits. The AND and OR legends are shown in FIG. 3. The system comprises the clipper amplifier 1, the delay line time compressor or Deltic, 6, the heterodyne frequency analyzer, 8–12, the display circuitry 13 and 14, and the control circuitry 15–34. The input signal of frequencies 0 to $f_m$ is converted to binary voltages, 1 and 0, by the clipper amplifier 1. The clipped signal is sampled every $T_s$ which should be less than $\frac{1}{2} f_m$. Successive bits are transferred through AND gate 4 to the delay line 6A every four $T_s$ seconds. If, of course, the shift register 2 of FIG. 1 were employed the $T_s$ period would be lengthened. The samples recirculate through delay line 6A and AND gate 3 in $$\left[ T_s - \frac{T_s}{N} \right]$$

seconds. N is the number of signal samples over which processing is to be carried. This loading operation continues until a display mode is desired by the operator.

The sample and control pulse generator 15 produces the sample signal S and its complement $\bar{S}$; the shift pulse signals when register 2 is used; the internal trigger of $1/NT_s$, such as 1 pulse per second for the sweep frequency oscillator; and the 100 p./s. signal for the two counters 20 and 30. All the control pulses are generated by counting down from a basic clock frequency of the Deltic systems.

As stated, the input signal is converted to a binary signal in the clipper amplifier 1 and the clipped signal is sampled every $T_s$, where $T_s \leq \frac{1}{2} f_m$. The loading operation, including feedback without delay from the output of the delay line 6A to the input of the delay line through gate 3 and with the explained precession, continues until a pulse is received from output terminal C of the preset counter 30. The pulse C switches the Deltic from the loading mode to the storage mode by recirculating the stored samples through the delay line 7 and the AND gate 5. The responsible logic operation, at this point, includes the setting of the flip-flop 21 to inhibit gate 3 and 4 and the enabling of gate 5. The first sweep oscillator trigger pulse ($1/NT_s$) after pulse C, starts the display sweep. It is essential that the horizontal sweep start with the S pulse so that one sweep occurs simultaneously with one recirculation of the memory.

The counter 20 determines the duration of the display and hence the number of horizontal sweeps of the display storage tube trace. In the example of FIG. 2, the 100 p./s. output of the generator 15 is applied to the counter through gate 19. The vertical sweep occurs only once during each display period. The duration of the vertical sweep is determined by the counter while the extent of the sweep is determined by the sweep rate.

The sweep rate of the sweep oscillator 8 is inversely related to the bandwidth of bandpass filter 10. The lowpass filter 11 removes the frequency components above $Nf_m$ c.p.s. In the modulator 9 the output of the lowpass filter is multiplied by the output of the sweep frequency oscillator 8 to produce sum and difference frequencies. The sum frequencies in the output of the modulator are passed by the bandpass filter 10, while the difference frequencies are rejected, in the example considered here. The output of the bandpass filter are envelope detected and amplitude compressed to accommodate the limited intensity range of the control grid circuit of the display tube.

The specific timing control circuits of FIG. 2 will now be described in some detail. The control circuits enable the operator to initiate any one of the four modes of operation mentioned above, including (1) undelayed manual triggering, (2) delayed manual triggering, (3) amplitude or threshold level triggering, and (4) amplitude triggering with signal inhibition after each display. In these external trigger modes the signals to be analyzed are applied to both the signal input terminal and to the external trigger input. That is, the signals as applied to the inputs of clipper amplifier 1 and to amplitude trigger device 33. When the signal amplitude exceeds a preselected level or threshold level, a short pulse, such as one millisecond is produced at the output of the amplitude trigger device 33 which enables the AND gate 34. The output of the AND gate 34 resets counter 30 and sets flip-flop 24. The counter produces pulses B, C and D at preset numbers as it counts the 100 p./s. signal received from generator 15. Pulse B and the output of AND gate 34 enables AND gate 26 which sets the flip-flop 32. The set output of flip-flop 32 inhibits AND gate 34 so the counter 30 cannot be reset again until after pulse D has reset flip-flop 32. Pulse C sets flip-flop 25, the combined set outputs of flip-flops 24 and 25 enables AND gate 22 and conditions AND gate 17 so the next sweep oscillator trigger pulse enables it. The output of AND gate 22 resets flip-flop 21, thus switching the feedback circuits of the Deltic system from the loading mode to the storage and display mode. That is, flip-flop 21 inhibits AND gate 3 and 4 and enables AND gate 5. The output of AND gate 17 resets flip-flop 18. The reset output of flip-flop 18 enables AND gate 19 and 23 and triggers the vertical sweep of the display raster generator 14. AND gate 19 passes the 100 p./s. signal to counter 20 while AND gate 23 passes the 500 p./s. signal to the horizontal trigger of the display raster generator 14. At the preset count the output of counter 20 sets flip-flop 21 and resets flip-flops 24 and 25. Setting flip-flop 21 switch the feedback circuits of Deltic system from the storage mode to the loading mode and sets flip-flop 18. AND gates 19 and 23 are inhibited when flip-flop 18 is set. This blocks the inputs to counter 20 and the horizontal trigger of the display raster generator 14. This ends one load and display cycle of the analyzer.

In recycling, incident to the signal amplitude trigger mode, the preset counter 30 is reset as it produces pulse D and resets flip-flop 32. This conditions AND gate 34 so the output of the amplitude trigger can enable AND gate 34 during the period counter up to pulse B.

In the hold or amplitude trigger mode, counter 30 is not preset at pulse D, but holds the count until reset by the external trigger.

The delayed manual trigger resets flip-flop 28. This conditions AND gate 29 so that when flip-flop 24 is reset at the end of the display cycle AND gate 29 will be enabled, starting a new load of the analyzer.

The undelayed manual trigger set flip-flop 21 and reset flip-flops 24, 25 and 28. Setting flip-flop 21 transfers the Deltic to the loading mode while resetting flip-flops 24 and 28 resets counter 30. This combination starts the load without delay.

The control circuits of FIG. 2 in the hands of a skilled operator can enable the operation of the time compression delay circuit to be importantly employed in analyzing short or long signal pulses.

Many modifications may be made in the details of the control circuits of this invention without departing from the spirit of the invention as defined in the appended claims.

What is claimed is:

1. In combination in a time compression frequency analyzer system;
  a pulse source for generating recurrent clock pulses at $T_s$ intervals of time;
  a source of signals to be analyzed, and means for converting said signals to a series of binary voltages;
  a time compression recirculating delay line having an input-to-output delay time of $T_s-T_{so}$, where $T_{so}$ is an integral sub-multiple of the time interval, $T_s$, and
  a first feedback circuit with zero delay time and a second feedback circuit with a delay time of $T_{so}$, and operator-controlled means for selectively connecting either of said first or said second feedback circuit between the output end and the input end of said delay line.

2. The combination defined in claim 1 further comprising;
  a gate with a signal path connected between said source of binary voltages and the input end of said delay line;
  the control circuit of said gate being responsive to said operator control means for selectively connecting and disconnecting said source of signals with said delay line.

3. In combination in a time compression system;
  a control pulse source for generating recurrent clock pulses at $T_s$ intervals of time;
  a source of signals to be analyzed and means for converting said signal to a series of binary voltages;
  a time compression delay line having a delay time of $T_s-T_{so}$, where $T_{so}$ is an integral sub-multiple of said delay time, $T_s$;
  a first feedback circuit with zero delay time and a second feedback circuit with a delay time of $T_{so}$;
  a first, a second and a third gate, the signal paths of said first and third gates being connected respectively in circuit with said first and said second feedback circuits;
  the signal circuit of said second gate being connected in series between said source of signal and the input end of said delay line, and
  operator controlled means for selectively operating said first, second and third gates for recirculating said signals selectively in times $T_s$, or in time $T_s-T_{so}$, and for admitting new signals from said source to said delay line during said period $T_s-T_{so}$.

4. The combination defined in claim 3 further comprising;
  a sweep frequency oscillator responsive to said control pulse source,
  a modulator with two inputs and one output, one of said inputs being connected to the output of said sweep frequency oscillator;
  a lowpass filter being connected between the output end of the $T_{so}$ delay line and the other input of said modulator;
  a bandpass filter connected to the output terminal of said modulator;
  an envelope detector and amplitude compressor connected to the output of said bandpass filter;
  a cathode ray display tube with a control electrode connected to the output of said envelope detector, the deflection electrodes X and Y of said display tube being connected to a raster generator, and control means for synchronizing the generation of X, Y raster voltages with the sweep voltages of said sweep frequency oscillator.

References Cited

UNITED STATES PATENTS

| | | | |
|---|---|---|---|
| 2,958,039 | 10/1960 | Anderson | 324—77 |
| 2,971,152 | 2/1961 | Ranky | 324—77 X |
| 3,076,932 | 2/1963 | Jaffe | 324—77 |
| 3,290,591 | 12/1966 | Byington | 324—77 |

RUDOLPH V. ROLINEC, *Primary Examiner.*

WALTER L. CARLSON, *Examiner.*

P. F. WILLE, *Assistant Examiner.*